Aug. 26, 1952 — H. RUMSEY, JR — 2,608,488
TUBULAR CASING
Filed June 8, 1949 — 2 SHEETS—SHEET 1
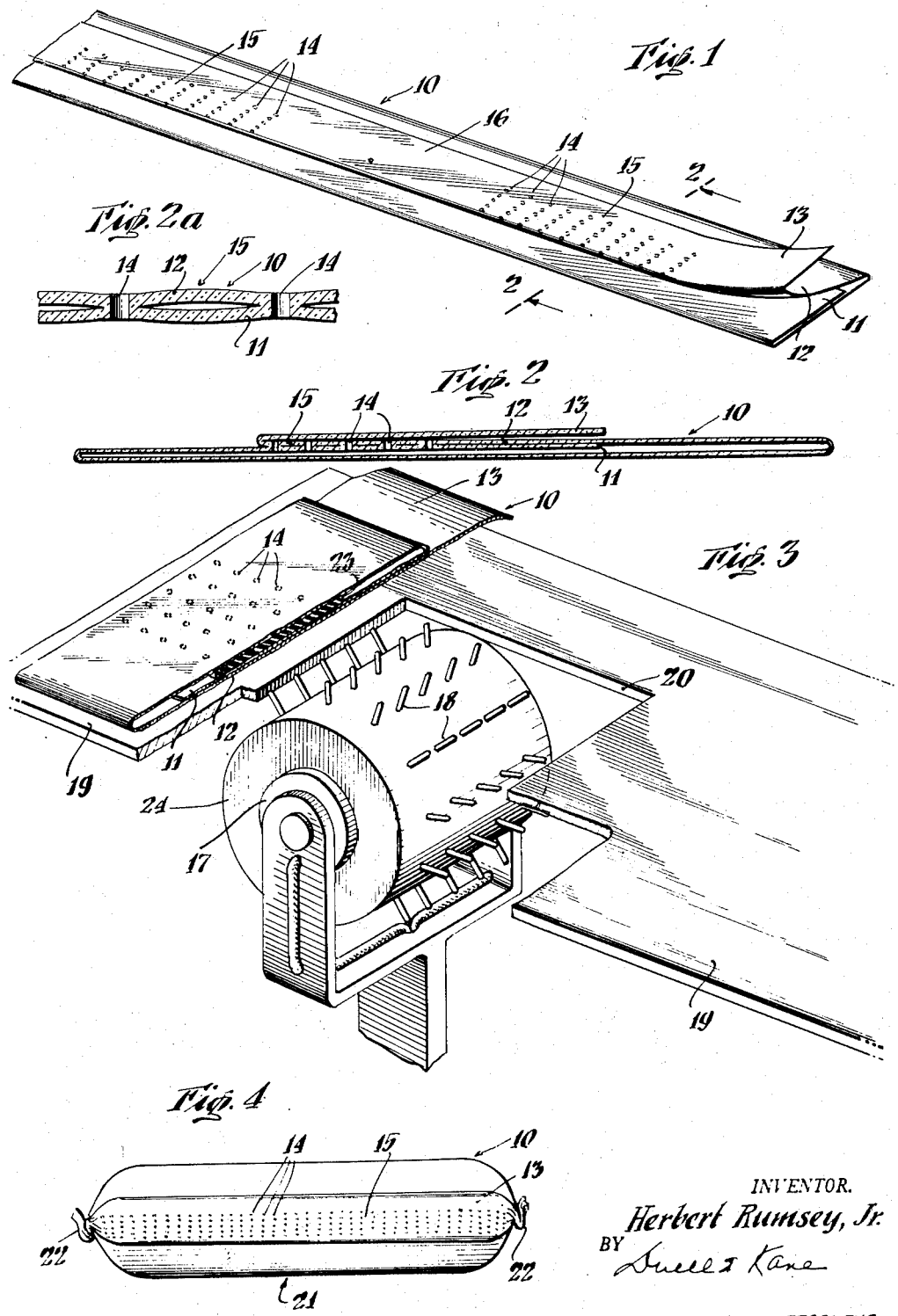
INVENTOR.
Herbert Rumsey, Jr.
BY
ATTORNEYS

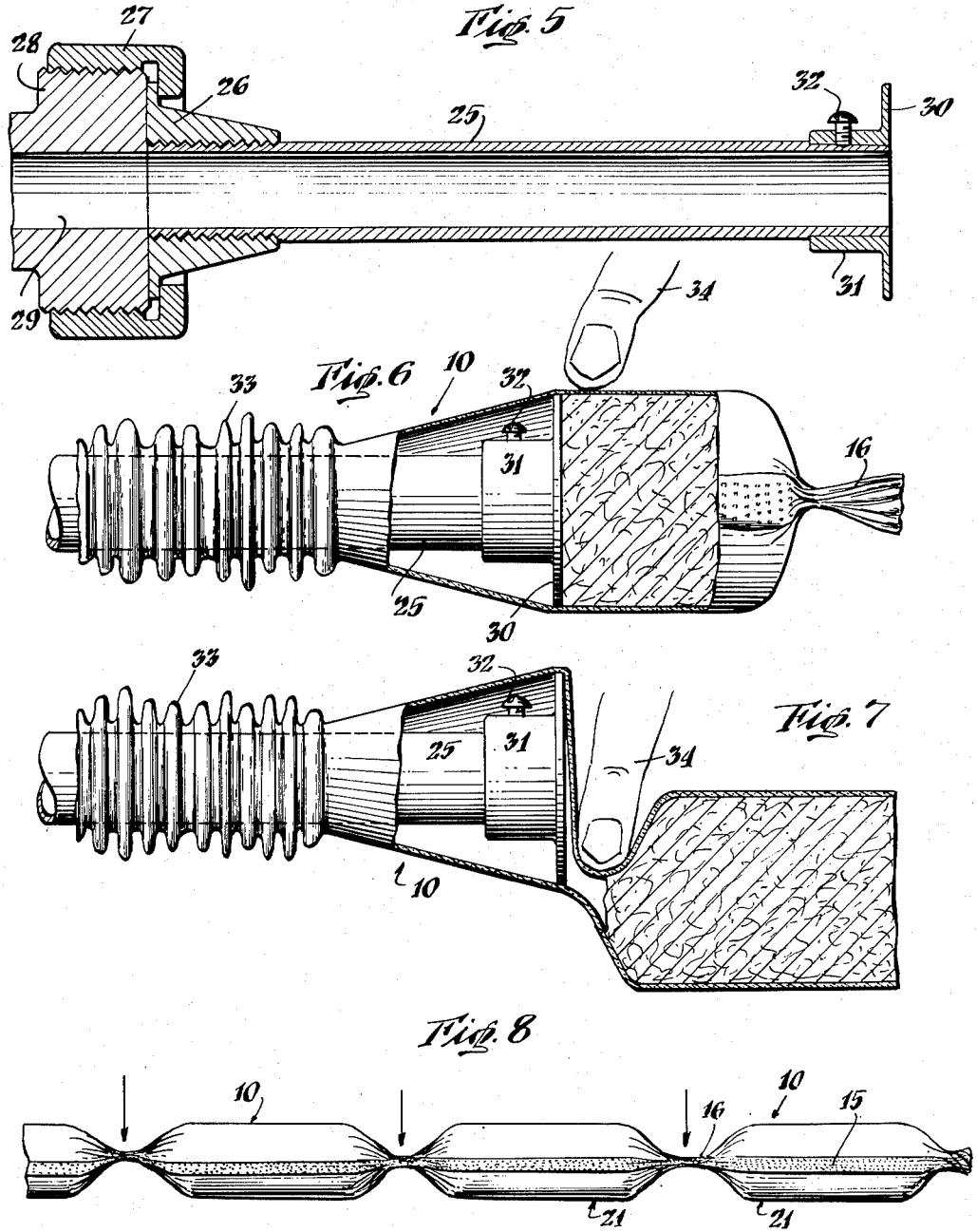

Patented Aug. 26, 1952

2,608,488

UNITED STATES PATENT OFFICE 2,608,488

TUBULAR CASING

Herbert Rumsey, Jr., Rochester, N. Y.

Application June 8, 1949, Serial No. 97,811

5 Claims. (Cl. 99—176)

This invention relates to an improved tubular casing particularly a casing of the type used for encasing food products, for instance plastic meat products such as sausage meat, ground meat and the like.

It is an object of the invention to provide an improved casing of the above character which is made from readily available, inexpensive materials, which is simple and inexpensive to manufacture, which can be readily used even by inexperienced operators to provide an encased food product, which serves very satisfactorily to protect and enclose the product while it is being transported, displayed or stored and which can be readily opened and the contents either partially or completely removed whenever desired.

My invention contemplates the fabrication of a tubular casing from a sheet or strip of synthetic plastic material (particularly a thermoplastic material) by folding the strip or sheet longitudinally and overlapping and sealing the longitudinal edges in the improved manner hereinafter described so that the edges will remain in closed position when in ordinary use but can be readily opened when desired. My improved casing has an attractive appearance and when it is used to encase a food product such as sausage, bologna, frankfurts or ground meat or the like it not only has the utilitarian advantages set forth above but also has considerable eye-appeal.

Further objects will be apparent from the following detailed description of the drawings in which—

Fig. 1 is a perspective view of an elongated tubular casing embodying my invention;

Fig. 2 is a cross sectional view on the line 2—2 of Fig. 1;

Fig. 2a is a detailed view showing the fused connection between the overlapping portions of the casing;

Fig. 3 illustrates one method in which my casing may be made from sheet or strip material;

Fig. 4 is an elevational view of a meat product wrapped in my improved casing;

Fig. 5 is a longitudinal sectional view of a modified type of stuffing horn that may be used in filling my improved casing;

Fig. 6 is a side view of the stuffing horn with the casing applied thereto and showing one step in filling the casing;

Fig. 7 is a view similar to Fig. 6 illustrating the manner in which the individual food products or units may be separated from each other and from the end of the stuffing horn; and Fig. 8 is an elevational view of a plurality of individual food products or units incorporated in the same casing.

As shown most clearly in Figs. 1 and 2, my improved casing, illustrated generally by the numeral 10, is made of an elongated strip or sheet of thermoplastic film molded longitudinally upon itself and secured together, preferably in a non-continuous manner, along the overlapping longitudinal edges to provide an elongated tube.

Various types of thermoplastic sheet material may be employed such as cellulose acetate, vinyl resin or rubber hydrochloride. However, I prefer to employ a material which is slightly elastic and resilient and for this purpose I have found that rubber hydrochloride, available on the market under the trade mark name "Pliofilm," particularly the type of Pliofilm identified as FF Pliofilm is very satisfactory. The strip or sheet of Pliofilm or other material is preferably relatively long and narrow and is folded longitudinally upon itself with the overlapping portions secured together at a plurality of spaced points or spots, to form a casing or tube.

The specific manner in which I prefer to secure the edges together is shown most clearly in Figs. 1 and 2. Thus, one longitudinal edge portion 11 and a strip or area 12 adjacent the second longitudinal edge portion are in overlapping relationship and are attached together with the second mentioned longitudinal edge portion, illustrated at 13, arranged in the form of a flap overlying the attached area. While the flap 13 is desirable it is not essential and may be omitted if desired.

The edge portion 11 and the portion 12 are secured together in a manner that will withstand ordinary usage but which can be separated, when desired to open the casing. For this purpose I prefer to attach the two portions together in the manner taught in my copending patent application Serial No. 37,978 filed July 10, 1948 and now Patent No. 2,545,243, and Serial No. 84,297 filed March 30, 1949. Thus, the overlapping portions 11 and 12 are fused at a plurality of spaced points or spots providing spaced apertures 14 with their edges fused or sealed together.

In the tubular casing 10 the spaced apertures with fused edges indicated at 14 may extend for the entire length of the casing but are preferably extended through areas indicated at 15 arranged in spaced relationship with respect to each other and having areas 16 therebetween which are free or substantially free of such apertures and fused spots. Such areas 16 may be provided with one such aperture 14 at about the central portion thereof so as to provide a relatively loose connection for the area 16. Thus, it will be seen that the tubular casing 10 has alternate attached areas 15 and substantially unattached areas 16 extending throughout the length thereof.

The attached areas 15 are preferably substantially equal in length to the length of the package or product to which the casing is to be applied and the areas 16 serve as the closures for the end of the package or product as will be later more fully explained and should be long enough to serve for this purpose.

The fused apertures 14 may be made in any desired manner as, for instance, by means of the apparatus disclosed in my above identified patent applications. Thus, in Fig. 3 I have shown apparatus of the type disclosed in my patent application Serial No. 84,297 comprising a cylindrical member 24 mounted for rotary movement and having a heating element 17 at the central portion thereof and projecting prongs 18 which are heated by the heating element 17 to a sufficiently high temperature so that they will fuse the Pliofilm or other thermoplastic material when they engage therewith.

A platen 19 is provided above the cylinder having an aperture 20 formed therein through which the prongs 18 project. The aperture and platen are so arranged that a sheet of material placed on the platen will engage the prongs but will not engage the body of the cylinder. The cylinder 24 and aperture 20 are made of sufficient width to correspond with the desired width of the area 15 to be provided with fused apertures.

The sheet of thermoplastic material is formed into a tube with the portions 11 and 12 in overlapping relationship and with the flap 13 arranged to expose these overlapped areas. The outer overlapping portion 12 of the thermoplastic material can then be brought into contact with the prongs 18 and drawn over the cylinder or rotor causing it to rotate. The circumference of the cylinder can be such that one rotation thereof will cause an area of the desired length. When the area 15 has been thus formed the operator skips an area 16 of the desired length making a single engagement as at the central portion thereof with one of the prongs so as to form an aperture 14. Thereafter, the operation is repeated throughout the length of the casing.

It will be appreciated that when the prongs engage the sheet material it causes it to fuse or melt at a plurality of spaced points forming apertures at these points. Upon cooling of the material, it will be fused or sealed around the peripheral edges holding the two layers together at spaced circular points.

A shield of non-thermoplastic material which is unaffected by the temperature of the prongs is preferably inserted in the casing in back of the overlapping portions 11 and 12 during the fusing operation as shown at 23.

After forming and fusing the casing the outer longitudinal edge or flap 13 is folded back against the overlapping portions 11 and 12. If desired the flap 13 may be held in this position by lightly fusing it or spotting it with an adhesive. However, the twisting of the ends in the finished package as hereafter explained serves adequately to hold the flap in place.

When the tubular casing 10 has been completed in this fashion it can be used in the usual manner of synthetic casing for encasing plastic meat products such as sausage meat, frankfurts, hamburger, bologna or the like. In this connection an elongated length of the casing may be filled in interrupted fashion throughout each of the areas 15 leaving voids or unfilled areas throughout the areas 16. Each of the areas 16 can then be severed at its central portion, at or near the fused aperture, providing several products or packages each of which may be closed and sealed at the ends or, if preferred, the casing may be separated at each of the intervals 16 prior to filling and each separate casing section thus provided can be separately filled throughout the area 15 and closed or sealed at the end areas 16.

In Fig. 4 I have illustrated a finished product or package 21 encased in a section of my improved tubular casing 10. The package is filled with a product such as sausage meat and the perforated sealed area 15 extends for the length of the product. The unsealed areas 16 at the two ends of the package have been closed and sealed in a suitable manner. Thus, the two end portions have been twisted tightly so as to stress the Pliofilm or other material beyond its elastic limit but short of its yield point and when the torque or twisting force is thereafter released the twisted ends remain in their closed or twisted condition as shown at 22.

Prior to twisting the ends, the operator should be sure that the outer longitudinal edge portion or flap 13 is folded back upon the portions 11 and 12 so as to cover the apertures. The twisting of the ends will then retain the flap 13 in this relationship.

A package of the type as illustrated in Fig. 4 will remain in closed position and will not accidentally open and the contents thereof are fully protected. Thus, it will be seen that the overlapping flap 13 extends over the sealing apertures serving as a closure therefor. The twisted ends 22 will remain tightly closed when made in the manner described above and the sealing apertures 14 serve to hold the overlapping portions of the casing in attached relationship. However, the package may be readily opened when desired by untwisting one or both of the ends thereof. When the end has been untwisted it will be appreciated that, since the overlapping edges of this area have not been attached together, they may be readily separated and by pulling the two edges apart the fused connection around the apertures 14 may be readily broken throughout the area 15 particularly due to the fact that these fused connections are in spaced relationship.

The opening action may be readily controlled so as to break the connection throughout the entire length of the package or for only a portion thereof. If it is only desired to dispense or use a portion of the contents, the package may be partially opened, a portion of the contents removed and thereafter the end portion which has been opened may again be twisted tightly against the package and will serve to hold it in closed relationship. In closing the package each time the operator should be careful to arrange the flap 13 in overlapping relationship with respect to the perforated area.

The casing may, of course, be filled in any desired manner. Where the casing is to be used in elongated fashion to provide a number of separate food products such as frankfurts, sausages or the like, I preferably fill the casing by applying it to a stuffing horn of the type shown in Figs. 5, 6 and 7 attached to a sausage stuffer. The stuffing horn takes the form of a cylindrical tube 25 having attaching flange 26 connected by threaded collar 27 to the outlet nozzle 28 of a sausage stuffer.

The sausage stuffer is operated in the usual manner to discharge plastic or ground meat products under pressure, through the aperture 29 and thence outwardly through my cylindrical stuffing horn. The outer end of the stuffing horn is provided with a ring-shaped or annular, flat plate 30 mounted on a collar 31 secured to the stuffing horn by set screw 32. The plate 30 is slightly smaller in diameter than the diameter of the tubular casing to be stuffed thereby.

In operation, the casing is drawn over the plate 30 onto the cylindrical stuffing horn 25 and a sufficient length is thus placed over the horn to provide the desired number of frankfurts, sausage or the like. A considerable length of casing may thus be drawn over the stuffing horn since it may be arranged in shirred or telescopic fashion on the stuffing horn as shown at 33 in Figs. 6 and 7.

The extreme end of the casing is withdrawn beyond the plate 30 and the end area 16 is compressed and held in closed position in the hand of the operator. The sausage stuffer is then operated to dispense a sufficient quantity of ground meat to fill the casing for the length of one area 15. In this connection, the area 15 may be so arranged as to be capable of holding a reasonable amount of ground meat, for instance one pound, or any desired fraction thereof, and the sausage stuffer is arranged and operated to dispense a measured amount into the casing upon each operation. The operator slightly resists the force of the meat discharged into the casing so as to cause the casing to be expanded and filled throughout the area 15.

When one area 15 has thus been filled the operator, with his fingers or with an implement, as shown at 34 in Figs. 6 and 7 wipes across the face of the plate so as to cause a clean separation between the contents of the area 12 and the plate 30 and the undispensed meat in the stuffer. This same result may be accomplished in other manners as, for instance, by simply grasping the stuffed portion of the casing in the hand of the operator and twisting it sharply, but only slightly, causing a complete break between the contents of the casing and the plate 30 and the undispensed portion of the meat. Simultaneously, the filled portion 15 is drawn outwardly from the plate 30.

Thereafter, the next unsealed area 16 is tightly pressed together by the operator and the next succeeding area 15 is filled in similar fashion. This operation is repeated until each of the areas 15 of the casing on the stuffing horn has been filled with the areas 16 left void or unfilled. The casing and contents will then appear as shown in Fig. 8 with alternate filled and empty areas. The filled portions extending throughout the length of the areas 15 and the unfilled portions extending throughout the unsealed areas 16. A number of separate units or products are thus provided which may be severed from each other at the center of each area 16 and the area 16 may then be closed in the manner described with respect to the package or product shown in Fig. 4. In other words, after properly arranging flap 13, the unattached areas at the end of each unit may be tightly twisted so as to stretch the Pliofilm beyond its elastic limit but short of the yield point and the twisted portions will then be retained in closed position. Instead of twisting the ends, they may be closed by heat sealing, tying with string or any other desired method.

It will thus be seen that I have provided an improved tubular casing which is made from readily available, relatively inexpensive materials, which is inexpensive to manufacture, which can be readily used even by inexperienced operators to provide encased food products, which will serve to protect the contents and will not accidentally open during shipment, storage and display and which can be readily opened when desired so that all or only a portion of the contents are available. Modifications may, of course, be made in the illustrated and described embodiment without departing from my invention as set forth in the accompanying claims.

I claim:
1. An artificial casing for food products comprising an elongated strip of thin thermoplastic film folded longitudinally upon itself with portions arranged in overlapping relationship so as to form a tubing said overlapping portions being detachably connected together by means of a plurality of spaced apertures extending through said portions with the edges of the apertures fused together.

2. An artificial casing for food products as set forth in claim 1 having a flap integrally connected with said film and positioned to cover the apertures in the overlapping portions.

3. An artificial casing for food products comprising an elongated strip of thin thermoplastic film folded longitudinally upon itself with portions arranged in overlapping relationship so as to form a tube said overlapping portions being provided with areas alternately arranged longitudinally of the tube in which the portions are detachably secured together by means of a plurality of spaced apertures extending through said portions and having their edges fused together and also having areas between said alternate areas in which said overlapping portions are substantially free from attachment.

4. An artificial casing for food products as set forth in claim 3 having a flap integrally connected with said film and arranged so that it will cover the apertures in the overlapping portions.

5. An artificial casing for food products as set forth in claim 3 in which the thermoplastic film is made of an elastic resilient material.

HERBERT RUMSEY, JR.

REFERENCES CITED

The following references are of record in the file of this patent:

UNITED STATES PATENTS

| Number | Name | Date |
|---|---|---|
| 990,547 | Gunuskey | Apr. 25, 1911 |
| 1,617,848 | Henderson | Feb. 15, 1927 |
| 1,659,375 | Schmidt | Feb. 14, 1928 |
| 1,890,215 | De Cressey | Dec. 6, 1932 |
| 1,959,978 | Freund | May 22, 1934 |
| 2,101,958 | Sachsenroder | Dec. 14, 1937 |
| 2,136,106 | Kern | Nov. 8, 1938 |
| 2,138,462 | Trabold | Nov. 29, 1938 |
| 2,210,436 | Weingand et al. | Aug. 6, 1940 |
| 2,328,018 | Irmscher | Aug. 31, 1943 |
| 2,335,159 | Salfisberg | Nov. 23, 1943 |
| 2,362,460 | Barnett | Nov. 14, 1944 |
| 2,384,462 | Goodman | Sept. 11, 1945 |

OTHER REFERENCES

"Food Industries," February 1939, pages 78 and 79, article entitled "Zipper Sausage Has More."